United States Patent
Bude et al.

(10) Patent No.: US 10,461,291 B2
(45) Date of Patent: Oct. 29, 2019

(54) CURRENT-INTERRUPT DEVICE FOR BATTERY CELL

(71) Applicant: Ford Global Technologies, LLC, Dearborn, MI (US)

(72) Inventors: Bogdan Bude, Canton, MI (US); Philip Michael Gonzales, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 132 days.

(21) Appl. No.: 15/838,741

(22) Filed: Dec. 12, 2017

(65) Prior Publication Data
US 2019/0181402 A1    Jun. 13, 2019

(51) Int. Cl.
| | |
|---|---|
| H01M 2/10 | (2006.01) |
| H01M 10/04 | (2006.01) |
| H01M 2/34 | (2006.01) |
| H01M 2/02 | (2006.01) |
| H01M 10/0525 | (2010.01) |
| B60L 11/18 | (2006.01) |
| B60L 50/64 | (2019.01) |

(52) U.S. Cl.
CPC .......... H01M 2/1077 (2013.01); B60L 50/64 (2019.02); H01M 2/0285 (2013.01); H01M 2/1061 (2013.01); H01M 2/34 (2013.01); H01M 10/0413 (2013.01); H01M 10/0525 (2013.01); H01M 2220/20 (2013.01)

(58) Field of Classification Search
CPC combination set(s) only.
See application file for complete search history.

(56) References Cited

U.S. PATENT DOCUMENTS

| | | | | |
|---|---|---|---|---|
| 4,078,121 A | * | 3/1978 | Gratzmuller | H01M 2/1205 429/54 |
| 4,328,290 A | * | 5/1982 | Szymborski | H01M 2/1205 429/54 |
| 5,541,016 A | * | 7/1996 | Schumm, Jr. | F15C 5/00 429/402 |
| 5,750,277 A | * | 5/1998 | Vu | H01H 37/043 429/61 |
| 6,037,071 A | | 3/2000 | Poirier et al. | |
| 6,204,635 B1 | * | 3/2001 | Sullivan | H01M 2/0426 320/134 |
| 6,256,853 B1 | * | 7/2001 | Piantoni | B21D 39/048 29/243.5 |
| 6,342,826 B1 | * | 1/2002 | Quinn | H01H 35/343 337/13 |

(Continued)

Primary Examiner — Kaity V Chandler
(74) Attorney, Agent, or Firm — Dave Kelley; Brooks Kushman P.C.

(57) ABSTRACT

A battery cell includes an electrode, a terminal, and a current-interrupt device configured to electrically isolate the terminal from the electrode. The current-interrupt device includes a plate connected to the electrode and defining a hole, and a diaphragm connected to the terminal and joined to the plate forming a ceiling of the hole. A cover of the current-interrupt device is joined to the plate forming a floor of the hole. A dielectric fluid is disposed in the hole. The diaphragm and cover are configured to move toward the terminal, in response to pressure within the cell exceeding a threshold, to separate the diaphragm from the plate forming a gap therebetween and to release the fluid into the gap preventing current from arching across the gap.

20 Claims, 3 Drawing Sheets

(56) References Cited

U.S. PATENT DOCUMENTS

| | | | |
|---|---|---|---|
| 6,570,749 B1 | 5/2003 | Ling et al. | |
| 8,383,256 B1 * | 2/2013 | Fu | F16K 99/0001 |
| | | | 429/163 |
| 8,443,840 B2 * | 5/2013 | Nemoto | H01M 2/1229 |
| | | | 137/845 |
| 9,692,038 B2 * | 6/2017 | Tsuruta | H01M 2/345 |
| 2006/0243729 A1 * | 11/2006 | Diehl | H01M 2/1229 |
| | | | 220/203.01 |
| 2008/0008928 A1 | 1/2008 | Partin et al. | |
| 2008/0254343 A1 * | 10/2008 | Kaplin | H01M 2/1223 |
| | | | 429/53 |
| 2014/0045013 A1 | 2/2014 | Minami et al. | |
| 2015/0079432 A1 * | 3/2015 | Okuda | H01M 2/345 |
| | | | 429/61 |
| 2015/0236334 A1 * | 8/2015 | Lee | H01M 2/1205 |
| | | | 429/82 |

* cited by examiner

CURRENT-INTERRUPT DEVICE FOR BATTERY CELL

TECHNICAL FIELD

This disclosure relates to traction-battery assemblies for use in electric or hybrid vehicles, and more specifically to current-interrupt devices for battery cells.

BACKGROUND

Vehicles such as battery-electric vehicles (BEVs), plug-in hybrid-electric vehicles (PHEVs), and full hybrid-electric vehicles (FHEVs) contain a traction battery assembly to act as an energy source for the vehicle. The traction battery may include components and systems to assist in managing vehicle performance and operations. The traction battery may also include high voltage components.

SUMMARY

According to one embodiment, a battery cell includes an electrode, a terminal, and a current-interrupt device configured to electrically isolate the terminal from the electrode. The current-interrupt device includes a plate connected to the electrode and defining a hole, and a diaphragm connected to the terminal and joined to the plate forming a ceiling of the hole. A cover of the current-interrupt device is joined to the plate forming a floor of the hole. A dielectric fluid is disposed in the hole. The diaphragm and cover are configured to move toward the terminal, in response to pressure within the cell exceeding a threshold, to separate the diaphragm from the plate forming a gap therebetween and to release the fluid into the gap preventing current from arching across the gap.

According to another embodiment, a current-interrupt device for a battery cell includes a plate defining a hole and a diaphragm joined to the plate and covering a top of the hole. The current-interrupt device further includes a cover that seals a bottom of the hole. A dielectric fluid is disposed in the hole. The current-interrupt device is configured so that the diaphragm and cover are movable to separate the diaphragm from the plate forming a gap and to release the fluid into the gap in response to cell pressure exceeding a threshold.

According to another embodiment, a battery cell includes an electrode, a terminal, and a current-interrupt device configured to mechanically disconnect the terminal from the electrode. The current-interrupt device includes a cavity filled with dielectric fluid and a movable lid that seals the cavity and forms a current path between the electrode and the terminal when in a sealed position, and inhibits the current path when in a ruptured position that allows leaking of the fluid to further inhibit the path.

DETAILED DESCRIPTION

Figure 1:
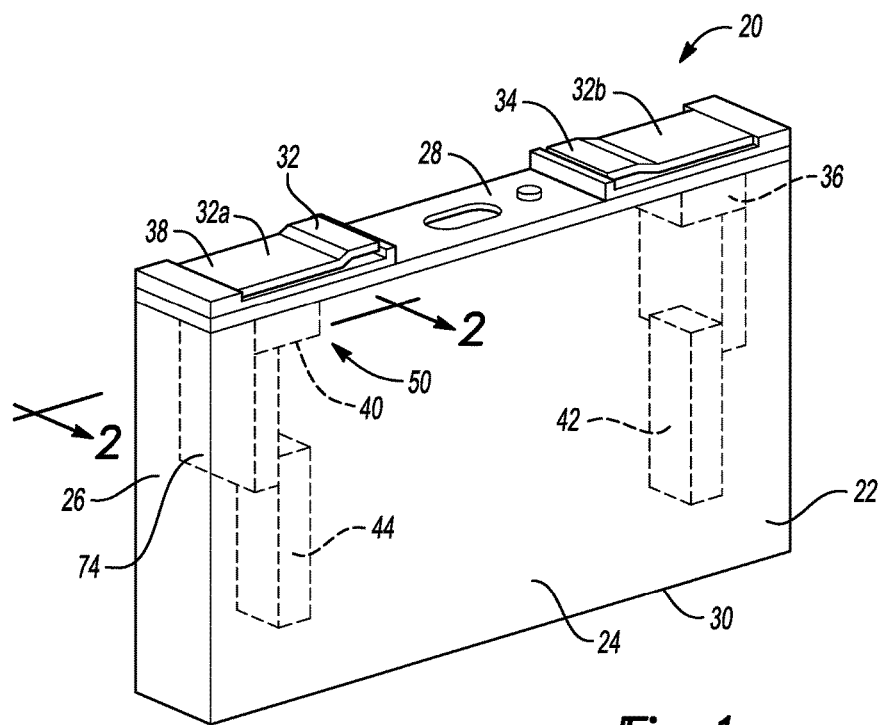
FIG. 1 is a perspective view of a battery cell.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A typical electric or hybrid-electric vehicle may include one or more electric machines powered by a traction-battery assembly. The electric machines can act as motors to provide propulsion. The electric machines can also act as generators to recover energy through regenerative braking to charge the traction-battery assembly.

The traction battery may provide a high-voltage direct current (DC) output from one or more battery-cell arrays, sometimes referred to as battery-cell stacks, within the traction battery. The battery-cell arrays may include one or more battery cells. The traction battery may be electrically connected to one or more power-electronics modules that condition power for the electric machines. The power-electronics module may be electrically connected to the electric machines and provides the ability to bi-directionally transfer electrical energy between the traction battery and the electric machines. For example, a typical traction battery provides a DC voltage while the electric machines require a three-phase alternating current (AC) voltage.

The vehicle may be recharged by an external power source. The external power source is a connection to an electrical outlet. The external power source may be electrically connected to electric vehicle supply equipment (EVSE). The EVSE may provide circuitry and controls to regulate and manage the transfer of electrical energy between the power source and the vehicle. The external power source may provide DC or AC electric power to the EVSE. The EVSE may have a charge connector for plugging into a charge port of the vehicle. The charge port may be any type of port configured to transfer power from the EVSE to the vehicle. The charge port may be electrically connected to a charger or on-board power-conversion module. The power-conversion module may condition the power supplied from the EVSE to provide the proper voltage and current levels to the traction battery. The power-conversion module may interface with the EVSE to coordinate the delivery of power to the vehicle. The various components discussed may have one or more associated controllers to control and monitor the operation of the components. The controllers may communicate via a serial bus (e.g., Controller Area Network (CAN)) or via discrete conductors.

The battery cells are configured to convert stored chemical energy to electrical energy. The cells may include a can (outer housing), a positive electrode (cathode) and a negative electrode (anode). An electrolyte may allow ions to move between the anode and cathode during discharge, and then return during recharge. Terminals allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel with similar terminals (positive and positive or negative and negative) adjacent to one another, or may be arranged in combined series-parallel.

Referring to FIG. 1, a battery cell 20, such as a prismatic cell, may include a can 22 having a pair of opposing major sides 24, a pair of opposing minor sides 26, a top 28, and a bottom 30. At least one terminal 32 is disposed on the top 28. In this example, the top 28 may be referred to as a terminal side of the can 22. The illustrated cell 20 includes a positive terminal 32a and a negative terminal 32b both on the top 28. The can 22 defines an interior. A positive electrode (cathode) 44, a negative electrode (anode) 42, and electrolyte are disposed in the interior. The negative terminal 32b includes an outer portion 34 disposed on an outside surface of the can 22 and an inner portion 36 electrically connected to the anode 42 via a first current path. The positive terminal 32a also includes an outer portion 38 disposed on an outside surface of the can 22 and an inner portion 40 electrically connected to the cathode 44 via a second current path.

Internal pressures may build within the interior of the can 22 during charging and discharging of the battery cell 20. Ideally, these internal pressures will not exceed a threshold value. The cell 20 may include a current-interrupt device 50 configured to interrupt an associated one of the first and second current paths to de-energize the cell 20 in response to the internal pressure exceeding the threshold. De-energizing the cell 20, via the current-interrupt device 50, reduces the likelihood of further increasing the pressure within the can 22.

Figure 2:
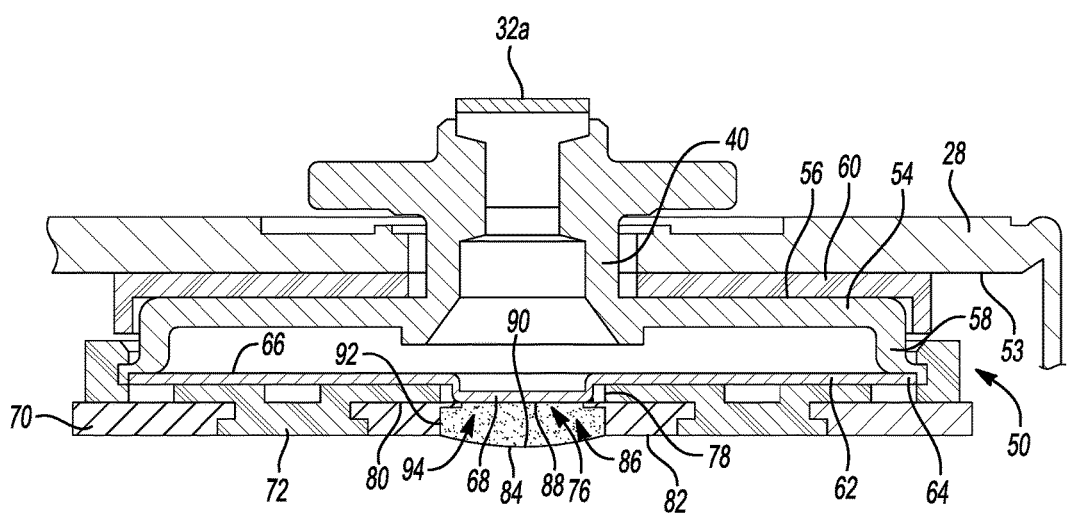
FIG. 2 is a cross-sectional view of the battery cell along cutline 2-2 with a current-interrupt device in a normal position.
Figure 3:
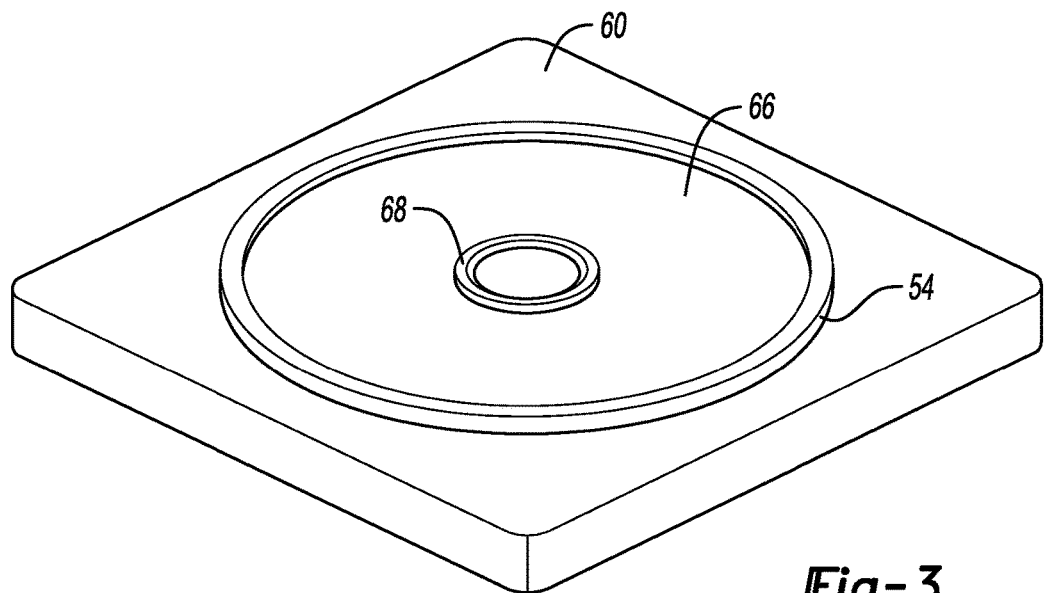
FIG. 3 is a partial perspective view of the current-interrupt device.

Referring to FIGS. 2 and 3, in one embodiment, the current-interrupt device 50 is associated with the positive terminal 32a and is physically disposed between the cathode 44 and the inner portion 40. In other embodiments, the device 50 may be associated with the negative terminal 32b. The device 50 may be attached to an underside 53 of the top 28 beneath the positive terminal 32a. The current-interrupt device 50 is configured to de-energize the cell 20 by physically disconnecting the terminal 32a and the cathode 44 to create an open in the second electrical path.

The current-interrupt device 50 may include an interrupt member 52 having a stationary support 54 and a movable diaphragm 62. The diaphragm 62 may be disk shaped. The interrupt member 52 is formed of an electrically conductive material. The support 54 is joined to the inner portion 40 of the positive terminal 32a. An upper insulating layer 60 may be disposed between the underside 53 of the top 28 and a top surface 56 of the support 54 to electrically insulate the interrupt member 52 and the can 22. The support 54 may be circular and have an annular sidewall 58 that extends downwardly from the top surface 56. The diaphragm 62 is joined to the sidewall 58 around a periphery 64 of the diaphragm 62 by welding, laser welding, soldering, ultrasonic welding, and the like. The diaphragm 62 may include a main portion 66 and a protrusion 68 that extends downward from a lower surface of the main portion 66. The protrusion 68 may be cylindrical and located at the center of the diaphragm 62. An electrically conductive plate 70 is disposed under the diaphragm 62 with a lower insulating layer 72 disposed between the main portion 66 and the plate 70. The plate 70 may be attached to the lower insulating layer 72, which is connected to the upper insulating layer 60 to suspend the plate 70 beneath the diaphragm 62. A conductor 74 (FIG. 1) connects the plate 70 to the cathode 44.

Figure 4:
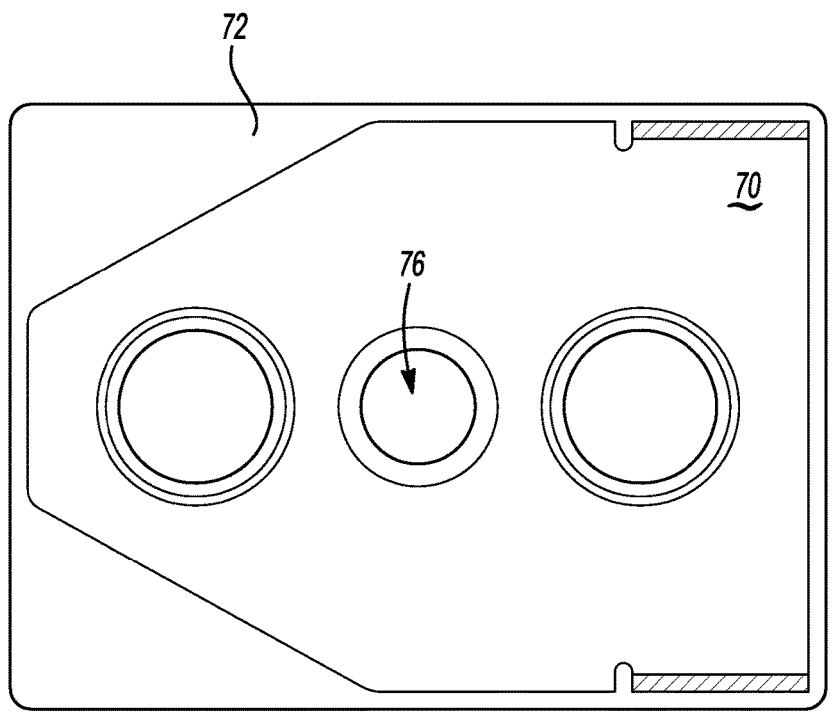
FIG. 4 is bottom view of a plate of the current-interrupt device.

Referring to FIGS. 2 and 4, the plate 70 defines a hole 76, and the lower insulating layer 72 defines a hole 78. The holes 76 and 78 may be circular and concentric with each other. The diameter of the hole 78 may be larger than the diameter of the hole 76 to expose an upper surface 80 of the plate 70. The protrusion 68 extends through the hole 78 to contact the upper surface 80. The diameter of the hole 76 and the diameter of the protrusion 68 may substantially match so that the sidewall of the protrusion 68 is disposed against an upper rim of the hole 76. The diaphragm 62 and the plate 70 may be electrically and physically connected to each other by welding, soldering, laser welding, ultrasonic welding, and the like.

A cover 84 is disposed on a lower surface 82 of the plate 70 to cover a bottom of the hole 76. The cover 84 may be a thin disk that is concentric with the hole 76. The diameter of the cover 84 may be smaller than the diameter of the diaphragm 62. A perimeter of the cover 84 may be attached around a lower rim of the hole 76. The cover 84 may be formed of metal, plastic, fabric, neoprene, polypropylene, silicone, and the like.

The diaphragm 62, the plate 70, and the cover 84 cooperate to define a fluid cavity 86 within the hole 76 with the protrusion 68 acting as a lid to form a ceiling 88 of the cavity, the cover 84 forming a floor 90 of the cavity, and the plate 70 defining a sidewall 92 of the cavity. A dielectric fluid 94 is disposed in the cavity 86. The dielectric fluid 94 may be contained within a sack or may be freely disposed within the cavity 86 in which case the diaphragm 62 and the cover 84 contain the fluid within the hole 76. The dielectric fluid 94 may be transformer oil such as mineral oil or synthetic oil. The mineral oil may be naphthenic oil or paraffinic oil. The synthetic oil may be silicon oil. The dielectric fluid 94 may have a dielectric strength that is greater than the maximum voltage design limit of the battery system.

FIG. 2 illustrates the current-interrupt device 50 in the normal operating position (also known as the unruptured, connected, or sealed position) with the diaphragm 62 joined to the plate 70 to form an electrical path between the terminal 32a and the cathode 44. The cover 84 is in a convex position in which the cover 84 projects at least slightly downward from the plate 70.

Figure 5:
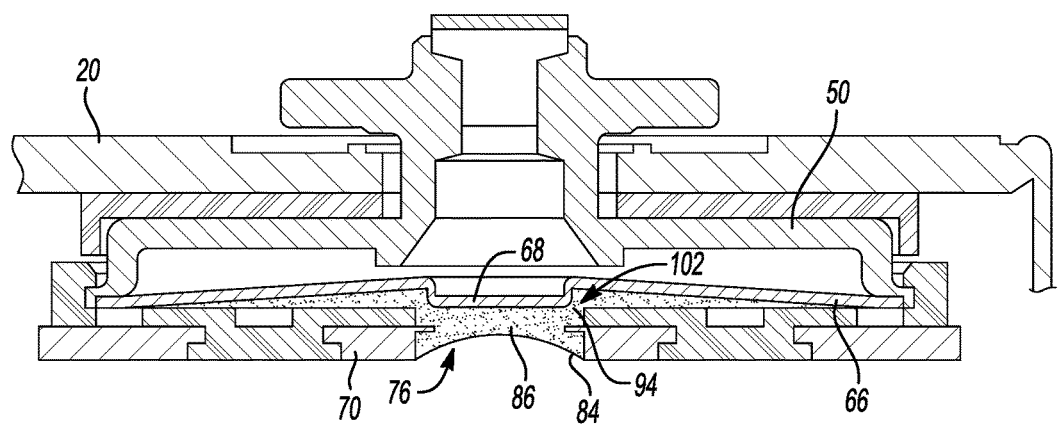
FIG. 5 is a cross-sectional view of the battery cell along cutline 2-2 with the current-interrupt device in a detached position.

Referring to FIG. 5, the cover 84 is configured to flex upward and into the hole 76 in response to the internal pressure within the cell 20 exceeding the threshold. This may be referred to as the concave position. Since the fluid 94 is incompressible, the flexing force of the cover 84 is transferred to the diaphragm 62 causing the diaphragm 62 to move upward to a detached position separating the protrusion 68 from the plate 70 when the internal fluid pressure exceeds the threshold. (The detached position may also be known as the ruptured or disconnected position.) This creates an open in the electrical path to de-energize the cell 20. The dielectric fluid 94 is released from the fluid cavity 86 when the diaphragm 62 moves to the detached position. The fluid 94 flows into a gap 102 defined between the separated diaphragm 62 and plate 70 to from a dielectric barrier across the gap 102. The fluid barrier prevents current from arching across the gap 102.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A current-interrupt device for a battery cell, the current-interrupt comprising:
    a plate defining a hole;
    a diaphragm joined to the plate and covering a top of the hole;
    a cover sealing a bottom of the hole; and
    a dielectric fluid disposed in the hole, wherein, the diaphragm and the cover are movable, responsive to cell pressure exceeding a threshold, separating the diaphragm from the plate forming a gap therebetween and releasing the fluid into the gap, and preventing current from arching across the gap.

2. The current-interrupt device of claim 1, wherein the cover is disk shaped and has an edge portion joined to the plate.

3. The current-interrupt device of claim 2, wherein the diaphragm is a disk, and a diameter of the diaphragm is smaller than a diameter of the cover.

4. The current-interrupt device of claim 1, wherein the plate is electrically connected to an electrode, and the diaphragm is electrically connected to a terminal.

5. The current-interrupt device of claim 3, wherein the diaphragm includes a main portion and a protrusion extending therefrom, the protrusion being sized to engage with the top of the hole, and wherein the disk is joined to the plate around a periphery of the protrusion.

6. The current-interrupt device of claim 5, wherein the protrusion is cylindrical.

7. The current-interrupt device of claim 1, wherein the cover is formed of metal.

8. The current-interrupt device of claim 1, wherein the cover is formed of plastic.

9. The current-interrupt device of claim 1, wherein the dielectric fluid is transformer oil.

10. A battery cell comprising:
    an electrode;
    a terminal; and
    a current-interrupt device configured to electrically isolate the terminal from the electrode, the current-interrupt device including
    a plate connected to the electrode and defining a hole,
    a diaphragm connected to the terminal and joined to the plate forming a ceiling of the hole,
    a cover joined to the plate forming a floor of the hole, and
    a dielectric fluid disposed in the hole, wherein the diaphragm and cover are configured to move toward the terminal, in response to pressure within the cell exceeding a threshold, to separate the diaphragm from the plate forming a gap therebetween and to release the fluid into the gap preventing current from arching across the gap.

11. The battery cell of claim 10, wherein the cover is disk shaped and has an edge portion joined to the plate.

12. The battery cell of claim 10, wherein the diaphragm includes a main portion and a protrusion extending therefrom, the protrusion being configured to engage with a top of the hole, and wherein the diaphragm is joined to the plate around a periphery of the protrusion.

13. The battery cell of claim 10, wherein the electrode is a cathode.

14. The battery cell of claim 10, wherein the dielectric fluid is transformer oil.

15. A battery cell comprising:
    an electrode;
    a terminal; and
    a current-interrupt device configured to electrically isolate the terminal from the electrode, the current-interrupt device including
    a plate connected to the electrode and defining a hole,
    a diaphragm connected to the terminal and joined to the plate to cover a first side of the hole,
    a cover joined to the plate to cover a second side of the hole, and
    a dielectric fluid disposed in the hole, wherein the diaphragm and cover are configured to move toward the terminal, in response to pressure within the cell exceeding a threshold, separating the diaphragm from the plate forming a gap therebetween and releasing the fluid into the gap, and preventing current from arching across the gap.

16. The battery cell of claim 15, wherein the cover is disk shaped and has an edge portion joined to the plate.

17. The battery cell of claim 15, wherein the diaphragm includes a main portion and a protrusion extending therefrom, the protrusion being configured to engage with the first side of the hole, and wherein the diaphragm is joined to the plate around a periphery of the protrusion.

18. The battery cell of claim 17, wherein the protrusion is cylindrical.

19. The battery cell of claim 15, wherein the electrode is a cathode.

20. The battery cell of claim 15, wherein the dielectric fluid is transformer oil.

* * * * *